US011814765B1

(12) United States Patent
Herfindahl et al.

(10) Patent No.: US 11,814,765 B1
(45) Date of Patent: Nov. 14, 2023

(54) METHOD OF PRINTING A TAG AND ATTACHING THE TAG TO A BAG

(71) Applicant: CMSI Technologies, Maple Grove, MN (US)

(72) Inventors: Robert Herfindahl, Plymouth, MN (US); Mathew M. Benner, Elk River, MN (US); Eric L. Sorensen, Champlin, MN (US); Lamar Sorensen, Hanover, MN (US)

(73) Assignee: CMSI Technologies, Maple Grove, MN (US)

( * ) Notice: Subject to any disclaimer, the term of this patent is extended or adjusted under 35 U.S.C. 154(b) by 387 days.

(21) Appl. No.: 16/392,265

(22) Filed: Apr. 23, 2019

(51) Int. Cl.
| D05B 35/06 | (2006.01) |
| B65C 9/26 | (2006.01) |
| B65C 7/00 | (2006.01) |
| B65C 9/00 | (2006.01) |
| B65C 9/02 | (2006.01) |
| B41J 3/407 | (2006.01) |
| B41J 11/00 | (2006.01) |
| B65G 43/08 | (2006.01) |
| G05B 19/402 | (2006.01) |

(52) U.S. Cl.
CPC .......... *D05B 35/066* (2013.01); *B41J 3/4075* (2013.01); *B41J 11/0005* (2013.01); *B65C 7/00* (2013.01); *B65C 9/0015* (2013.01); *B65C 9/02* (2013.01); *B65C 9/26* (2013.01); *G05B 19/402* (2013.01); *B65C 2009/0018* (2013.01); *B65C 2210/0037* (2013.01); *B65G 43/08* (2013.01); *B65G 2203/0208* (2013.01)

(58) Field of Classification Search
CPC .................................................. D05B 35/066
See application file for complete search history.

(56) References Cited

U.S. PATENT DOCUMENTS

| 5,189,967 | A | * | 3/1993 | Schips et al. ........ | D05B 35/066 |
| | | | | | 112/113 |
| 5,421,948 | A | * | 6/1995 | Crankshaw et al. ..... | B65C 9/30 |
| | | | | | 156/542 |
| 5,479,757 | A | * | 1/1996 | Ogawa .................. | B65B 61/20 |
| | | | | | 156/556 |
| 10,802,463 | B1 | * | 10/2020 | Herfindahl et al. ... | D05B 35/066 |
| 2002/0021844 | A1 | * | 2/2002 | Rusert et al. .......... | B65D 29/04 |
| | | | | | 383/107 |
| 2014/0133784 | A1 | * | 5/2014 | Liang et al. ........... | B65D 33/28 |
| | | | | | 383/102 |
| 2015/0273882 | A1 | * | 10/2015 | Akahori et al. ..... | B41J 2/16585 |
| | | | | | 347/16 |
| 2017/0270834 | A1 | * | 9/2017 | Vandyk ................. | A41D 27/08 |
| 2018/0334279 | A1 | * | 11/2018 | Korthäuer et al. ... | B65C 9/1884 |
| 2019/0047738 | A1 | * | 2/2019 | Nishimura et al. ...... | B65C 9/02 |
| 2020/0180802 | A1 | * | 6/2020 | Chowdhury ........... | B65B 43/04 |

* cited by examiner

*Primary Examiner* — Matthew G Marini
(74) *Attorney, Agent, or Firm* — Vidas, Arrett & Steinkraus PA; Richard A. Arrett; Edwin E. Voigt, II

(57) ABSTRACT

A method of printing a tag and attaching the tag to a bag for printing, severing and feeding non-curled tags to sewing machines. The method of printing a tag and attaching the tag to a bag comprising providing a control unit, a bag conveyor, a bag switch, a printer unit, a guide plate sensor, and a feeder assembly; feeding print material into the printer unit through a side entry port; printing and severing a tag; dispensing the tag from an exit port of the printer unit to the staging assembly; and subsequently dispensing the tag upon demand into the feeder assembly for movement to the tag attaching system.

18 Claims, 2 Drawing Sheets

METHOD OF PRINTING A TAG AND ATTACHING THE TAG TO A BAG

CROSS-REFERENCE TO RELATED APPLICATIONS

This application is related to the co-pending application entitled "TAG PRINTER APPARATUS", filed on Apr. 23, 2019 under application no. [attorney docket 17474US01], the entire contents of which is hereby incorporated by reference.

STATEMENT REGARDING FEDERALLY SPONSORED RESEARCH

Not Applicable

FIELD OF THE INVENTION

The present invention relates to tag assemblies and more particularly pertains to a new method of printing a tag and attaching the tag to a bag for printing, severing and feeding non-curled tags to sewing machines.

DESCRIPTION OF THE PRIOR ART

The use of tag assemblies is known in the prior art. More specifically, tag assemblies heretofore devised and utilized are 15 known to consist basically of familiar, expected and obvious structural configurations, notwithstanding the myriad of designs encompassed by the crowded prior art which have been developed for the fulfillment of countless objectives and requirements.

The prior art includes tag assemblies which print individual tag which are not directly fed to sewing machine. While these devices fulfill their respective, particular objectives and requirements, the aforementioned patents do not disclose a new method of printing a tag and attaching the tag to a bag.

SUMMARY OF THE INVENTION

The general purpose of the present invention, which will be described subsequently in greater detail, is to provide a new method of printing a tag and attaching the tag to a bag which has many of the advantages of the tag assemblies mentioned heretofore and many novel features that result in a new method of printing a tag and attaching the tag to a bag which is not anticipated, rendered obvious, suggested, or even implied by any of the prior art tag assemblies, either alone or in any combination thereof. The present invention includes providing a control unit, a bag conveyor, a bag switch, a printer unit, a guide plate sensor, and a feeder assembly; feeding print material into the printer unit through a side entry port; printing and severing a tag having a width larger than a height of the tag in the printer unit; dispensing the tag from an exit port of the printer unit to the feeder assembly; and feeding the tag to a sewing machine whereupon the tag is attached to a bag. None of the prior art includes the combination of the elements of the present invention.

There has thus been outlined, rather broadly, the more important features of the method of printing a tag and attaching the tag to a bag in order that the detailed description thereof that follows may be better understood, and in order that the present contribution o the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new method of printing a tag and attaching the tag to a bag which has many of the advantages of the tag assemblies mentioned heretofore and many novel features that result in a new method of printing a tag and attaching the tag to a bag which is not anticipated, rendered obvious, suggested, or even implied by any of the prior art tag assemblies, either alone or in any combination thereof.

Still another object of the present invention is to provide a new method of printing a tag and attaching the tag to a bag for printing, severing and feeding non-curled tags in unison to sewing machines.

Still yet another object of the present invention is to provide a new method of printing a tag and attaching the tag to a bag that continuously feeds printed tags to a sewing machine which sews the tags to the packaging.

Even still another object of the present invention is to provide a new method of printing a tag and attaching the tag to a bag that prevents the tag from being curled and can be adjusted to print on any size tag.

The advantages the present invention provides are that the low profile design aids in the installation where most existing systems have many items overhead and in the way of a vertical system. Also the low profile provides for ease of supply replenishment. Also the low profile allows the printing mechanism to lay on its side which permits the manufacturing of a tag with a long horizontal tag dimension for greater attachment area of the tag. Also the laid down printer design eliminates the free falling of the tag following cutting which permits cocking of the tag in the staging pocket and subsequent cocking of the tag on the customers container. Also, the laid down printer design aids in the controlling of the tag as it is dispensed permitting flattening of the tag controlling the "bowing" of the tag. Finally, the laid down version allows for larger supply rolls thus longer times between roll replenishment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein.

DETAILED DESCRIPTION OF THE INVENTION

Figure 1:
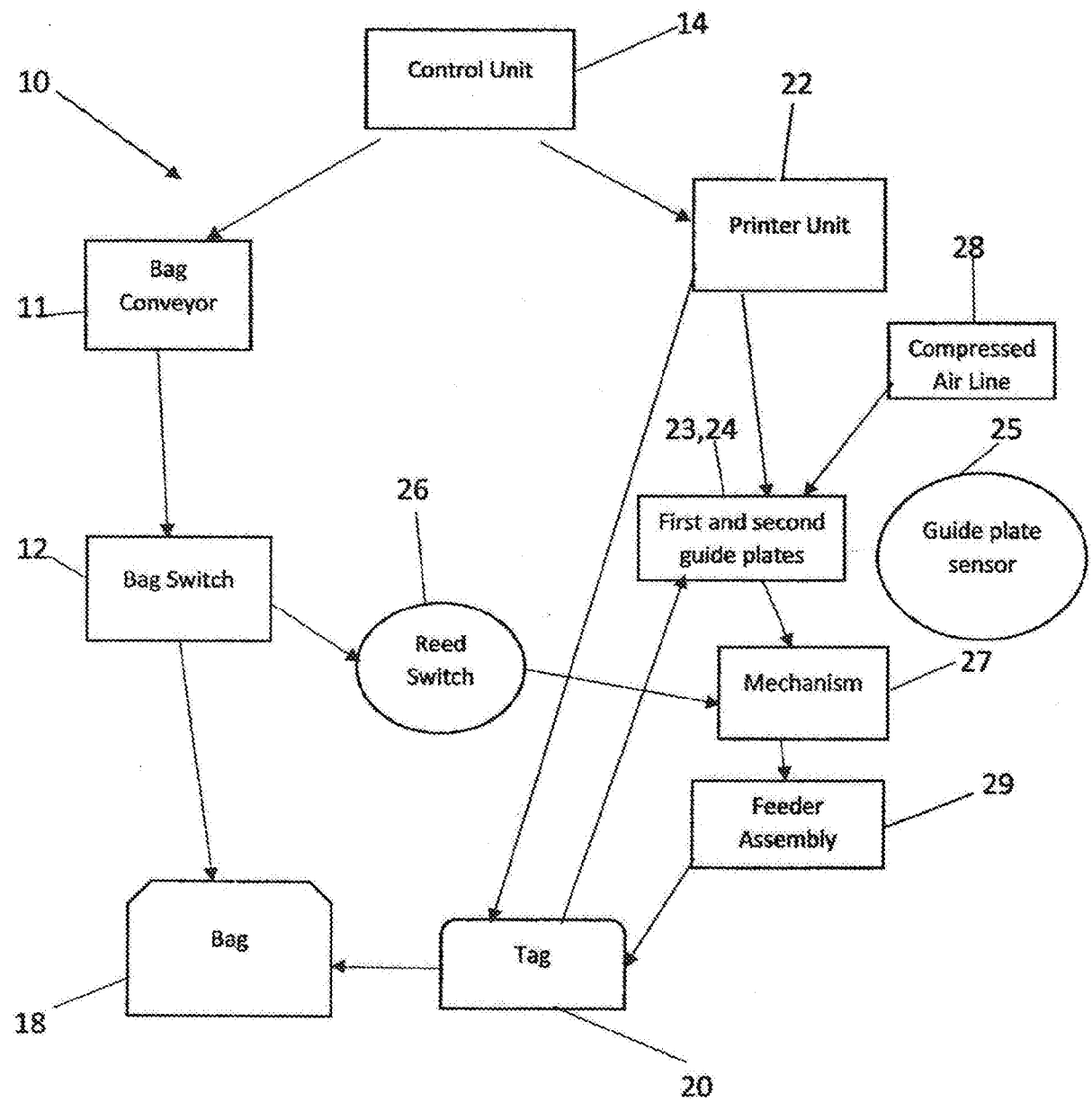
FIG. 1 is a block diagram of a new method of printing a tag and attaching the tag to a bag according to the present invention.
Figure 2:
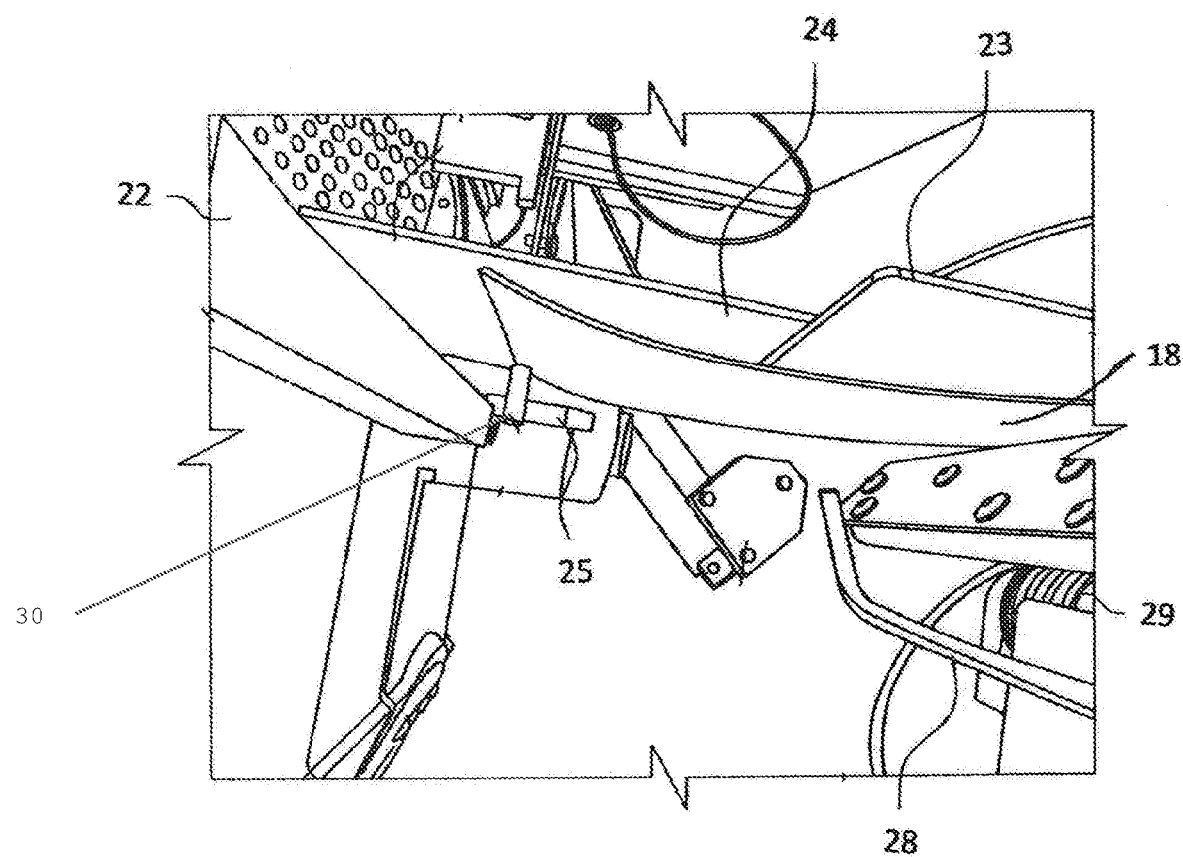
FIG. 2 is a partial top plan view of the printer unit and the support assembly of the present invention.

With reference now to the drawing, and in particular to FIGS. 1 and 2 thereof, a new method of printing a tag and attaching the tag to a bag embodying the principles and concepts of the present invention will be described.

As best illustrated in FIGS. 1 and 2, the method of printing a tag and attaching the tag to a bag 10 generally comprises providing a control unit 14, a bag conveyor 11, a bag switch 12, a printer unit 22, first and second guide plates 23, 24, a guide plate sensor 25, and a feeder assembly 29; feeding print material into the printer unit 22 through a side entry port; printing and severing a tag 20 having a width larger than a height of the tag 20 in the printer unit 22; dispensing the tag 20 from an exit port of the printer unit 22 to the feeder assembly 29; and feeding the tag 20 to a sewing machine whereupon the tag 20 is attached to a bag 18. While the invention is described in connection with attaching the tag or label to a bag 18 using a sewing machine, it should be understood that the invention can dispense the tag or label to any type of commercially available tag or label attaching device, such as a bag sealer.

The method of printing the tag and attaching the tag to the bag 10 also comprises an adjustable compressed air line 28 for blowing compressed air onto the tag 20 being dispensed from the printer unit 22 to the feeder assembly 29, and also comprises a first guide plate 23 conventionally attached adjacent to the exit port of the printer unit 22 and a second guide plate 24 conventionally connected to a support assembly and adjustably overlapping the first guide plate 23 with the compressed air line 28 conventionally blowing compressed air onto the tag 20 being dispensed along the first and second guide plates 23, 24 to prevent curling and jamming of the tag 20. The tag 20 is supported on its edge (in a vertical orientation) by pin 30 as the tag is being fed to the feeder assembly 29, and while the compressed air line 28 is preventing the tag from curling and jamming as it is being fed to the feeder assembly 29. The second guide plate 24 is horizontally adjusted relative to the first guide plate depending upon a desired width of the tag 20. The control unit 14 effects movement of the bag 18 upon the bag conveyor 11 with the bag 18 tripping the bag switch 12 causing the tag 20 to be moved from the printer unit 22 to the feeder assembly 29 and into contact with the bag 18 whereupon the tag 20 is conventionally attached to the bag 18. A reed switch 26 is in conventional communication with a mechanism 27 such as a brush for conventionally energizing the mechanism 27 to move the tag 20 from the printer unit 22 to the feeder assembly 29. The reed switch tells the system that the air operated plunger driven by a solenoid is in the retracted position and it is clear to insert a tag into the staging area. Once the signal is received (as generated by the bag switch) to fire the air cylinder the system makes sure that the plunger is back and fires it against the spinning roller behind the tag sitting in the staging area. This roller is pressed against the tag only long enough for the tag to move from the staging area into the constant running inserting conveyor which moves the tag and inserts the tag into the downstream system.

The bag switch 12 is in operational and conventional communication with the reed switch 26 and upon the bag 18 tripping the bag switch 12 the bag switch conventionally signals the reed switch 26 which conventionally activates the mechanism 27 which moves the tag 20 side to side from the printer unit 22 to the feeder assembly 29. Upon the tag 20 being moved to the feeder assembly 29, the guide plate sensor 25 detects the guide plates to be empty. Upon detecting the guide plates 23, 24 to being empty, the guide plate sensor 25 triggers printing and severing a next tag 20 by the printer unit 22 and dispensing the next tag 20 upon the guide plates 23, 24. The control unit 14 conventionally effects movement of a next bag 18 upon the bag conveyor 11 with the bag tripping the bag switch 12 causing the next tag 20 to be moved from the guide plates 23, 24 to the feeder assembly 29 and into contact with the next bag 18 whereupon the next tag 20 is conventionally attached to the next bag 18. The tag 20 is conventionally sewn along a top edge thereof to the bag 18 with the tag 20 having a width greater than a height of the tag 20 thus providing no leverage to the tag 20 being ripped off the bag 18.

The control unit 14 shuts down the printer unit 22, the bag conveyor 11 and the feeder assembly 29 upon the bag 18, 19 not tripping the bag switch 12 or upon the tag 20 not being printed and dispensed along the first and second guide plates 23, 24 or upon the tag 20 not being moved from the first and second guide plates 23, 24 to the feeder assembly 29.

The tags can be provided on a roll and a suitable printer can cut the tags after printing, or precut tags can be fed to a suitable printer. The tag is fed to the feeder assembly 29, where it is held until the bag switch and the software trigger the dispensing of the tag to be attached to the bag.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the method of printing a tag and attaching the tag to a bag. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of printing a tag and attaching the tag to a bag comprising:
   providing a bag conveyor, a printer unit and a feeder assembly;
   feeding the tag without any pressure sensitive adhesive into the printer unit;
   printing and severing a tag in the printer unit;
   dispensing the tag from the printer unit to the feeder assembly;
   guide means attached adjacent the exit port of the printer unit;
   the guide means further comprising a first guide plate attached adjacent to the exit port of the printer unit and a second guide plate adjustably overlapping the first guide plate;
   feeding the tag to a sewing machine whereupon the tag is attached to a bag;

further comprising horizontally adjusting the second guide plate relative to the first guide plate depending upon a desired width of the tag;

further comprising a bag switch and a control unit and further wherein the movement of the bag is sensed by the control unit using the bag switch, thereby causing the tag to be moved from the printer unit to the feeder assembly and into contact with the bag whereupon the tag is picked up by the sewing machine and attached to the bag;

further comprising a reed switch in communication with a mechanism for energizing the mechanism to move the tag from the printer unit to the feeder assembly, and wherein the bag switch is in communication with the reed switch and upon the bag tripping the bag switch the bag switch signals the reed switch which initiates the process of moving the tag from a staging area into the feeder assembly and also initiates printing of the next tag for processing.

2. A method of printing a tag and attaching the tag to a bag comprising:

providing a bag conveyor, a printer unit and a feeder assembly;

feeding the tag into the printer unit;

printing and severing a tag in the printer unit;

dispensing the tag from the printer unit to the feeder assembly;

feeding the tag to a sewing machine whereupon the tag is attached to a bag;

further comprising an adjustable compressed air line for blowing compressed air onto the tag to hold the tag in position and flattening it as it is being staged awaiting a signal from a control unit, and further comprising a first guide plate attached adjacent to the exit port of the printer unit and a second guide plate adjustably overlapping the first guide plate with the compressed air line blowing compressed air onto the tag being dispensed along the first and second guide plates to prevent curling and jamming of the tag;

further comprising horizontally adjusting the second guide plate relative to the first guide plate depending upon a desired width of the tag;

further comprising a bag switch and a control unit and further wherein the movement of the bag is sensed by the control unit using the bag switch, thereby causing the tag to be moved from the printer unit to the feeder assembly and into contact with the bag whereupon the tag is picked up by the sewing machine and attached to the bag;

further comprising a reed switch in communication with a mechanism for energizing the mechanism to move the tag from the printer unit to the feeder assembly, and wherein the bag switch is in communication with the reed switch and upon the bag tripping the bag switch the bag switch signals the reed switch which initiates the process of moving the tag from a staging area into the feeder assembly and also initiates printing of the next tag for processing.

3. The method of printing the tag and attaching the tag to the bag as described in claim 2, wherein the reed switch permits the activation of the mechanism which moves the tag side to side from the printer unit to the feeder assembly.

4. The method of printing the tag and attaching the tag to the bag as described in claim 2 also comprising upon the tag being moved to the feeder assembly, a guide plate sensor detects when the guide plates are empty.

5. The method of printing the tag and attaching the tag to the bag as described in claim 4 further comprising upon detecting the guide plates to being empty, the guide plate sensor triggers printing and severing the next tag by the printer unit and dispensing the next tag upon the guide plates.

6. The method of printing the tag and attaching the tag to the bag as described in claim 5 also comprising the control unit sensing movement of a next bag upon the bag conveyor with the bag tripping the bag switch causing the next tag to be moved from the guide plates to the feeder assembly and into contact with the next bag whereupon the next tag is attached to the next bag.

7. The method of printing the tag and attaching the tag to the bag as described in claim 6 wherein the tag is attached to the bag.

8. The method of printing the tag and attaching the tag to the bag as described in claim 6 further comprising the control unit shutting down the printer unit, the bag conveyor and the feeder assembly upon the bag not tripping the bag switch.

9. The method of printing the tag and attaching the tag to the bag as described in claim 6 also comprising the control unit shutting down the printer unit once the next tag is printed and cut to length and placed in the staging position for the feeder assembly.

10. The method of printing the tag and attaching the tag to the bag as described in claim 6 further comprising the control unit shutting down the printer unit and the feeder assembly upon the tag not being moved from the first and second guide plates to the feeder assembly.

11. The method of printing the tag and attaching the tag to the bag as described in claim 2 wherein the tag has a width larger than a height of the tag.

12. The method of printing the tag and attaching the tag to the bag as described in claim 2 wherein the material is feed into the printer unit through a side entry port.

13. The method of printing the tag and attaching the tag to the bag as described in claim 2 wherein the tag is dispensed from an exit port of the printer unit.

14. A method of receiving a printed tag and staging the tag for on-demand dispensing to a feeder system, comprising the steps of:

providing a printer unit and a feeder system, the feeder system including a support device to support the tag;

dispensing the printed tag from the printer unit to the feeder system, while supporting the tag using a guide means, the guide means further comprising a first guide plate attached adjacent to the exit port of the printer unit and a second guide plate adjustably overlapping the first guide plate;

further comprising horizontally adjusting the second guide plate relative to the first guide plate depending upon a desired width of the tag;

further comprising a bag switch and a control unit and further wherein the movement of the bag is sensed by the control unit using the bag switch, thereby causing the tag to be moved from the printer unit to the feeder assembly and into contact with the bag whereupon the tag is picked up by the sewing machine and attached to the bag;

further comprising a reed switch in communication with a mechanism for energizing the mechanism to move the tag from the printer unit to the feeder assembly, and wherein the bag switch is in communication with the reed switch and upon the bag tripping the bag switch the bag switch signals the reed switch which initiates the process of moving the tag from a staging area into the feeder assembly and also initiates printing of the next tag for processing.

15. The method of receiving a printed tag and staging the tag for on-demand dispensing to a feeder system of claim 14 wherein the tags are provided on a roll and individually cut after being printed.

16. The method of receiving a printed tag and staging the tag for on-demand dispensing to a feeder system of claim 14 wherein the tags are precut from a roll.

17. The method of receiving a printed tag and staging the tag for on-demand dispensing to a feeder system of claim 14 wherein the support device is a pin.

18. The method of receiving a printed tag and staging the tag for on-demand dispensing to a feeder system of claim 14 wherein the tags are precut from a roll and fed into a sewing machine.

* * * * *